Patented Nov. 25, 1930

1,782,727

UNITED STATES PATENT OFFICE

HEINRICH JENSCH, OF HOCHST-ON-THE-MAIN, AND OTTO EISLEB, OF HOFHEIM-ON-THE-TAUNUS, GERMANY, ASSIGNORS TO WINTHROP CHEMICAL COMPANY, INC., OF NEW YORK, N. Y., A CORPORATION OF NEW YORK

BASIC NITRO DERIVATIVES OF 9 AMINOACRIDINE AND PROCESS OF PREPARING THE SAME

No Drawing. Application filed January 6, 1928, Serial No. 245,046, and in Germany January 11, 1927.

The present invention relates to basic nitro-derivatives of 9-aminoacridine and a process of preparing the same.

We have found that all of the hitherto known organic compounds of chemotherapeutic value are surpassed as regards their bactericidal efficacy by new acridine derivatives being nitro-acridine derivatives substituted 9 position by the group $NHR_1$ and in one of the other positions of the nucleus by a basic residue. The new compounds thus obtainable correspond to the general formula:

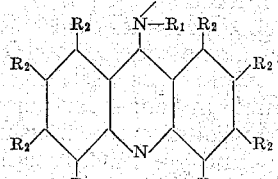

wherein $R_1$ stands for hydrogen or alkyl, at least one $R_2$ for the nitro group and another $R_2$ for a basic residue, the remaining $R_2$ representing hydrogen, halogen, or a nitro-, alkyl- or alkoxy group.

By the term "basic residue" is to be understood in the sense of the foregoing formula such radicals as contain at least one aliphatically bound N-atom and which may be linked to the acridine ring for instance through the medium of oxygen (in the manner of an ether) or of nitrogen (in the manner of an amine) or of carbon (in the manner of a C—C linkage).

The said new compounds are obtained by subjecting nitro-9-chloracridines, containing at least one of the above defined basic residues, to reaction with ammonia or a primary amine. Instead of nitro-9-chloracridines there may also be used the corresponding nitro-9-alkoxyacridines and nitro-9-aryloxyacridines for the preparation of the basic nitroacridines in question, or the transformation may be effected with the nitro-9-alkoxyacridines or the nitro-9-aryloxyacridines which are obtained as intermediate products. The reaction takes place in all cases, in presence or also in absence of a solvent.

The following examples illustrate our invention, but they are not intended to limit it thereto, the parts being by weight:

1. 2-β-diethylamino-ethoxy-6-nitro-9-aminoacridine.

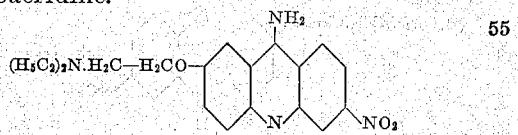

By heating 24 parts of potassium 2-chloro-4-nitrobenzoate and 21 parts of para-aminophenol-β-diethylamino-ethyl-ether in an amylalcoholic solution with the addition of some natural copper C (a very pure, finely divided form of copper), 4'-β-diethylamino-ethoxy-5-nitro-diphenylamine-2-carboxylic acid is obtained in the form of brownish crystals decomposing at 226° C. When treated according to Ullmann's process which is described in "Berichte der deutschen chemischen Gesellschaft" volume 40 (year 1907), page 4797, and which consists in transforming diphenylamino-ortho-carboxylic acids into acridones by treating them with aluminum chloride and phosphorus pentachloride the latter acid yields 2-β-diethylamino-ethoxy-6-nitroacridone which by treating it with phosphorus pentachloride is transformed into 2-β-diethylamino-ethoxy-6-nitro-9-chloracridine forming brownish needles with a golden luster and melting at 159° C. 160° C. Ammonia is introduced, while stirring, into a solution of 2-β-diethylamino-ethoxy-6-nitro-9-chloracridine in twice its weight of phenol. The temperature of the mixture is gradually raised to 130° C. to 150° C. by supplying heat from outside and maintained at these degrees for 15 minutes, while continuing the introduction of ammonia. The formation of the basic nitro-derivatives of 9-aminoacridine takes place according to the following equations:

(1) 

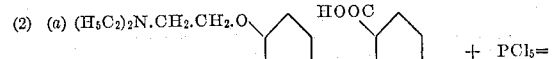

(2) (a) 

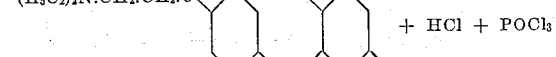

(b) 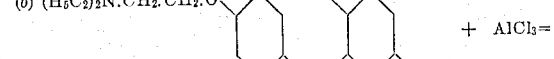

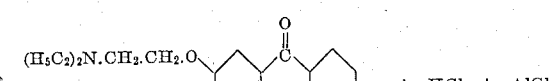

(3) 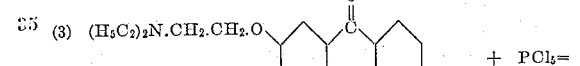

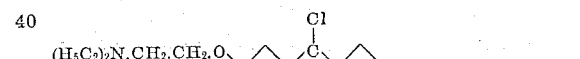

(4) 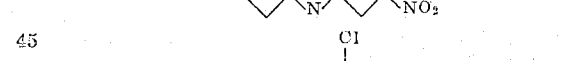

By precipitating the cooled mixture with acetone, a reddish-brown precipitate is obtained, which is filtered by suction, washed with acetone and dried, and then treated with water to which so much hydrochloric acid has been added that the whole mass just passes into solution and that this solution maintains its neutral reaction. The solution is evaporated in vacuo and the solid residue is purified by re-crystallizing it from alcohol of 80 per cent. strength. Thus, a brownish crystalline powder is obtained constituting the dihydrochloride of the 2-β-diethylaminoethoxy-6-nitro-9-aminoacridine with a content of 3 molecules of water of crystallization. It melts at 265° C., and is readily soluble in water. The addition of sodium acetate to the aqueous solution does not cause any precipitation of the base; but adding caustic soda solution thereto, the base is precipitated in the form of a red crystalline powder melting at 237° C. to 238° C.

2. 2-β-diethylamino-ethoxy-6-nitro-9-isoamylaminoacridine.

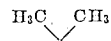
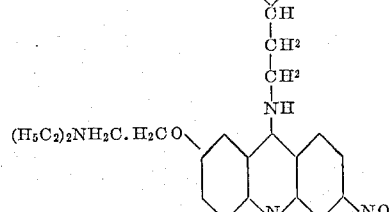

18.6 parts of 2(β-diethylaminoethoxy)-6-nitro-9-chloracridine, 5 parts of isoamylamine, 55 parts of phenol are gradually heated, while stirring, to 120° C. and the mass is maintained at this temperature for 15 minutes. After cooling, alcoholic hydrochloric acid, containing 2.5 parts of HCl, is added to the reaction product and the hydrochloride of the new compound is precipitated by means of ether, filtered by suction, thoroughly washed with ether and dried. It forms a brown crystalline powder which is very readily soluble in water, alcohol and chloroform, insoluble in benzene, ether and carbon disulfide. Its solution in water shows a neutral reaction and yields with sodium acetate no precipitate; with sodium carbonate or caustic soda solution the base is obtained as a red substance.

3. 2-β-piperidinoethoxy-6-nitro-9-aminoacridine.

By heating 12 parts of potassium 2-chloro-4-nitro-benzoate and 11 parts of 4-aminophenol-β-piperidinoethylether (melting point 56° C., boiling point 200° C. under 9 mm. pressure) in an amylalcoholic solution with the addition of a small quantity of natural copper C, 4'-β-piperidinoethoxy-5-nitro-diphenylamine-2-carboxylic acid is obtained melting at 225° C. with decomposition. By effecting the closure of the acridone-ring according to Ullmann's method and treating the product with phosphorus pentachloride, 2-β-piperidinoethoxy-6-nitro-9-chloracridine is obtained which forms brownish-yellow crystals melting at 175° C. to 176° C. The reaction with ammonia in phenol occurs in the same manner as in Example 1. Alcohol of 50 per cent. strength is used for recrystallizing the crude salt. The 2-β-piperidinoethoxy-6-nitro-9-aminoacridine dihydrochloride crystallizes with two molecules of water of crystallization into brown needles. It is readily soluble in water; on addition of sodium acetate the solution assumes a darker coloration, and on addition of ammonia the base is precipitated in the form of reddish-brown flakes melting at 243° C.

4. 4-β-diethylaminoethoxy-6-nitro-9-aminoacridine.

2'-β-diethylaminoethoxy-5-nitrodiphenylamine-2-carboxylic acid is obtained by subjecting 2-chlor-4-nitrobenzoic acid, potassium carbonate and 2-aminophenol-β-diethylaminoethylether (boiling point 152° C. under 7 mm. pressure) to reaction in amylalcohol with the addition of natural copper C as a catalyst. It forms a reddish-brown crystalline powder decomposing at 213° C. to 214° C. When treated with phosphorus pentachloride and aluminium chloride, this acid yields the 4-β-diethylaminoethoxy-6-nitroacridone which can further be transformed by means of phosphorus pentachloride into 4-β-diethylamino-6-nitro-9-chloracridine melting at 127° C. to 128° C.

5 parts of the last named chloracridine, 10 parts of phenol and 1 part of very finely pulverized ammonium chloride are mixed and heated, while stirring, the temperature being maintained for two hours at 120° C. to 130° C. There are then added thereto 30 parts of alcohol whereby crystals are precipitated. After having allowed the mass to stand for some time in the cold, it is filtered by suction, washed with alcohol and recrystallized from alcohol of 80 per cent. strength. The product thus obtained constitutes the 4-β-diethylaminoethoxy-6-nitro-9-aminoacridine dihydrochloride containing two molecules of water of crystallization and melting at 272° C. to 273° C. The base when precipitated from the solution of the salt in water by means of caustic soda solution, is a red powder which assumes a dark reddish-brown coloration on being dried on the water bath.

5. 2-β-diethylaminoethyl-6-nitro-9-aminoacridine.

By the reaction of β (4-nitrophenyl)-ethyl chloride with diethylamine and subsequent reduction by means of iron, there is obtained β (4-aminophenyl)-ethyl-diethylamine of the formula:

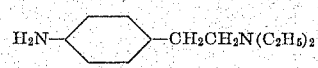

in the form of a colorless and nearly odorless liquid boiling at 143° C. to 146° C. under 7 mm. pressure.

By causing this amine to react with potassium 2-chlor-4-nitrobenzoate in an amylalcoholic solution in the presence of copper, 4'-diethylaminoethyl-5-nitro-diphenylamine-2-carboxylic acid is obtained which forms a brilliant red crystalline powder decomposing at 240° C. to 245° C. 2-diethylaminoethyl-6-nitro-acridone is prepared according to Ullmann's process and then transformed by means of phosphorus pentachloride into the 2-β-diethylaminoethyl-6-nitro-9-chloracridine. This chloracridine is reacted upon in phenol with ammonium chloride in the manner described in the preceding example. The salt, after being isolated and purified in the same manner, yields the 2-β-diethylaminoethyl-6-nitro-9-aminoacridine dihydrochloride containing two molecules of water of crystallization. The base precipitated from the solution of the salt in water by means of caustic soda solution is a red powder decomposing at 227° C.

6. 2-γ-diethylamino-propyloxy-6-nitro-9-aminoacridine.

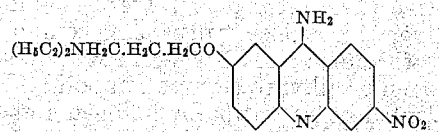

By causing sodium 4-acetaminophenolate to react with trimethylenechlorobromide, there is obtained 4-acetaminophenol-γ-chlorpropylether which melts at 113° to 115° C. This compound is transformed by means of diethylamine into 4-acetamino-phenol-γ-diethylaminopropylether which, on being split up with hydrochloric acid, yields the 4-aminophenol-γ-diethylaminopropylether in the form of a colorless and odorless oil boiling at 170° C. to 171° C. under 5 mm. pressure. By heating this substance with an equimolecular quantity of potassium 2-chlor-4-nitrobenzoate in amylacohol in the presence of copper, 4'-γ-diethylaminopropyloxy-5-nitro-dephenylamine-2-carboxylic acid is obtained which is transformed by way of the 2-γ-diethylamino-propyloxy-6-nitroacridone into the 2-γ-diethylaminopropyloxy-6-nitro-9-chloracridine. 3 parts of this chloracridine are heated with 1 part of ammonium chloride and 9 parts of phenol, while stirring, to 125° C. to 130° C. and kept at this temperature for 2 hours. After cooling, 30 parts of acetone are added thereto, the crystalline magma is filtered by suction, thoroughly washed with acetone and dried. By dissolving the substance in water and precipitating the filtered solution by means of caustic soda solution, the 2-γ-diethylaminopropyloxy-6-nitro-9-aminoacridine is separated as a brilliant brick-red powder. In order to transform it into the dihydrochloride, 1 part of the base is dissolved in 3 parts by volume of double normal hydrochloric acid by heating on the water bath and 6 parts by volume of alcohol are added thereto, whereupon the salt crystallizes into thin yellow needles. It is filtered by suction and washed with alcohol. It contains in this form water of crystallization which it gives off when dried at 140° C.

The nitro-acridines substituted in 9-position by halogen, which are named in the following claims as starting materials, are equivalents of nitro-9-alkoxy- or nitro-9-aryloxy-acridines which are formed from the nitro-9-halogen-acridines by treating them with sodium alcoholate or phenol. By the term "radical containing at least one aliphatically bound nitrogen atom" are to be understood such substituents being linked to the acridine ring, through the medium of oxygen (in the manner of an ether) or of nitrogen (in the manner of an amine) or of carbon (in the manner of the C—C linkage), and which contain at least one nitrogen atom not directly linked to the acridine ring.

We claim:

1. The process for preparing therapeutically active basic nitro derivatives of 9-aminoacridine, which consists in causing compounds of the formula: $NH_2R$ wherein R stands for hydrogen or alkyl to act upon nitro-acridines substituted in 9-position by halogen and substituted at another C-atom of the acridine ring by a radical containing at least one aliphatically bound N-atom.

2. The process for preparing therapeutically active basic nitro derivatives of 9-aminoacridine, which consists in causing compounds of the formula: $NH_2R$ wherein R stands for hydrogen or alkyl to act upon nitro-9-chloracridine substituted at a C-atom of the acridine ring by a radical containing at least one aliphatically bound N-atom.

3. As new products, the derivatives of nitro-9-aminoacridines of the following general formula:

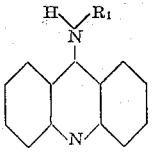

wherein $R_1$ represents hydrogen or alkyl, and in which one of the hydrogen atoms of one of the benzene nuclei is substituted by a radical containing at least one aliphatically bound nitrogen atom, at least one other hydrogen atom of the benzene nuclei is substituted by $NO_2$, and at least one of the remaining hydrogen atoms may be substituted by a monovalent substituent of the group including halogen, $NO_2$, alkyl and alkoxy.

4. As a new product, 2-β-diethylamino-ethoxy-6-nitro-9-aminoacridine of the formula:

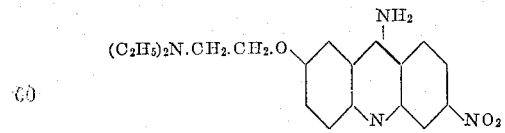

being a red crystalline powder melting at 237° C. to 238° C. and forming a dihydrochloride which is a brownish crystalline powder containing 3 molecules of water of crystallization and being readily soluble in water.

In testimony whereof, we affix our signatures.

HEINRICH JENSCH.
OTTO EISLEB.